Figure 1:
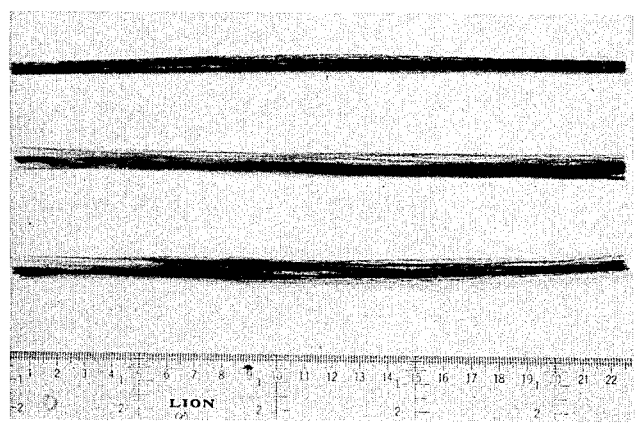

United States Patent [19]

Yajima et al.

[11] 4,158,687

[45] Jun. 19, 1979

[54] METHOD FOR PRODUCING HEAT-RESISTANT COMPOSITE MATERIALS REINFORCED WITH CONTINUOUS SILICON CARBIDE FIBERS

[75] Inventors: Seishi Yajima; Josaburo Hayashi; Mamoru Omori; Hideo Kayano; Masaaki Hamano, all of Ohnuki, Japan

[73] Assignee: The Research Institute For Iron, Steel and Other Metals of the Tohoku University, Sendai, Japan

[21] Appl. No.: 733,623

[22] Filed: Oct. 18, 1976

[30] Foreign Application Priority Data

Oct. 27, 1975 [JP] Japan .............................. 50-128297

[51] Int. Cl.² ...................... C04B 35/56; C04B 35/58
[52] U.S. Cl. ........................................ 264/60; 106/44; 264/62; 264/63; 264/65; 264/134; 264/308
[58] Field of Search .................... 106/44; 264/60, 62, 264/63, 65, 332, 308, 134

[56] References Cited

U.S. PATENT DOCUMENTS

| | | | |
|---|---|---|---|
| 3,653,851 | 4/1972 | Gruber | 106/44 |
| 3,681,113 | 8/1972 | Yoldas | 264/62 |
| 3,907,954 | 9/1975 | Mansmann et al. | 264/63 |
| 3,975,165 | 8/1976 | Elbert et al. | 264/60 |

OTHER PUBLICATIONS

Barta et al., "Import Strength of Alumina Composites," Cramie Bull., vol. 51, No. 5, (1972), pp. 464–470.
Crane et al., "Strength and Fracture Properties of Silicon Carbide Filament," Cu. Bull, vol. 54, No. 2, (1975), pp. 184–188.

Primary Examiner—Robert F. White
Assistant Examiner—John Parrish
Attorney, Agent, or Firm—Ladas, Parry, Von Gehr, Goldsmith & Deschamps

[57] ABSTRACT

A heat-resistant composite material reinforced with continuous silicon carbide fibers is produced by forming a powdery ceramics matrix and the fibers into a composite, and pressing and heating the composite into a sintered composite. The composite material is excellent in the mechanical strength at a high temperature, heat resistance, oxidation resistance and corrosion resistance.

11 Claims, 2 Drawing Figures

FIG_1

METHOD FOR PRODUCING HEAT-RESISTANT COMPOSITE MATERIALS REINFORCED WITH CONTINUOUS SILICON CARBIDE FIBERS

The present invention relates to a method for producing a heat-resistant ceramics composite material reinforced with continuous silicon carbide fibers.

Heat-resistant ceramics are used under severe conditions, such as super high temperature, super high pressure, corrosive atmosphere and the like. However, these heat-resistant ceramics are usually weak against mechanical shock and further are low in the mechanical strength and corrosion resistance at a high temperature. In order to obviate these drawbacks, cermet composite material consisting of ceramics and metal, or composite materials, which consist of ceramics and continuous fibers of fused quartz, alumina or carbon, short silicon carbide fibers or wiskers, have been developed.

However, the cermet composite material has not a satisfactorily high strength at a high temperature due to the fact that the metal constituting the cermet composite material is easily oxidized at a high temperature and has a softening temperature lower than that of ceramics. Therefore, the cermet composite material is short in the life and is limited in the use application.

While, in the composite materials consisting of ceramics and continuous fibers of fused quartz or alumina, the production cost of these fibers are very high, and moreover the fused quartz fibers are poor in the Young's modulus and the alumina fibers are poor in thermal shock resistance. Therefore, the use application of the ceramics composite materials reinforced with fused quartz fibers or alumina fibers is limited. Further, the composite material consisting of ceramics and carbon fibers can be produced relatively inexpensively in large scale, but has such a drawback that the composite material cannot be used under an oxidizing atmosphere at a high temperature. The composite materials, which consist of ceramics and short fibers of carbides such as silicon carbide and the like, short fibers of nitrides or wiskers, have a highest durability even under an oxidizing atmosphere at a high temperature. However, these fibers and wiskers have a length of at most about 30 mm, are not uniform in the fineness and are not homogeneous. Therefore, ceramics composite materials using these fibers or wiskers are not uniform in the strength and other properties, and further are easily broken by shearing, so that the composite materials are inferior to ceramics composite materials using continuous fibers in the strength. Moreover, these fibers and wiskers cannot be produced in a large scale and are high in the production cost, and the use of these fibers and wiskers has still various drawbacks in view of industrial and practical purposes.

An object of the present invention is to provide a method for producing a composite material, which is free from the above described drawbacks in the conventional ceramics composite materials. This object can be attained by producing a composite material consisting of ceramics and continuous silicon carbide fibers, which have been already invented by the inventors of the present invention and disclosed in a patent application as described hereinafter.

The present invention will be explained in more detail.

In the present invention, as starting materials for producing the composite material, continuous silicon carbide fibers, powdery ceramics as a matrix and a binder, which is used if necessary, are used.

An explanation will be made hereinafter with respect to the respective starting materials for the composite material.

The continuous silicon carbide fibers to be used in the present invention are produced by the production method disclosed in U.S. patent application Ser. No. 677,960 already filed by the inventors of the present invention. According to this method, homogeneous long fibers can be relatively easily obtained inexpensively, and moreover the resulting fibers are very excellent in the mechanical strength at a high temperature, heat resistance, oxidation resistance and corrosion resistance. In the production of the fibers the organosilicon low molecular weight compounds of the following groups (1)–(10) are used as the starting material.

(1) Compounds having only Si-C bond.
(2) Compounds having Si-H bond in addition to Si-C bond.
(3) Compounds having Si-Hal bond.
(4) Compounds having Si-N bond.
(5) Compounds having Si-OR (R is alkyl or aryl group) bond.
(6) Compounds having Si-OH bond.
(7) Compounds having Si-Si bond.
(8) Compounds having Si-O-Si bond.
(9) Esters of organosilicon compounds.
(10) Peroxides of organosilicon compounds.

From at least one of the organosilicon low molecular weight compounds belonging to the above described groups (1)–(10), organosilicon high molecular weight compounds having silicon and carbon as the main skeleton components, for example, the compounds having the following molecular structures, are produced by polycondensation reaction using at least one process of irradiation, heating and addition of a catalyst for the polycondensation.

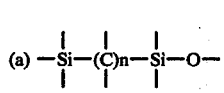

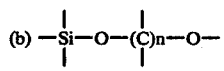

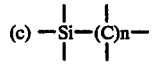

(d) The compounds having the above described skeleton components (a)–(c) as at least one of partial structures in linear, ring and three dimensional structures or mixtures of the compounds having the above described skeleton components (a)–(c).

From at least one of the organosilicon high molecular weight compounds containing at least one of the above described molecular structures, if necessary added with or reacted with a small amount of at least one of organic metal compounds, metal complexes and organic polymers other than the above described two compounds, is prepared a spinning liquid and then the spinning liquid can be spun into fibers having various lengths and uniform fineness. The spun fibers are heated at a low temperature within a temperature range of 50°–400° C. under an oxidizing atmosphere and then preliminarily heated at a temperature of 600°–1,000° C. under at least one atmosphere of vacuum, inert gases, CO gas, hydrocarbon compound gas, organosilicon compound gas and hydrogen gas to form the preliminarily heated continuous silicon carbide fibers. However, the above described preliminary heating is able to get along even under the above described atmosphere containing at least one of an oxidizing gas, a hydrocarbon compound gas and hydrogen gas in a partial pressure of less than 10 mmHg. The above described preliminarily heated fibers are baked at a temperature of 1,000°–2,000° C. under at least one of atmospheres of vacuum, inert gases, CO gas, hydrocarbon compound gas, organosilicon compound gas and hydrogen gas to form continuous silicon carbide fibers. The fibers obtained by the above described method are very excellent in the mechanical strength and oxidation resistance, and further excellent in the heat resistance, corrosion resistance and wear resistance inherent to SiC. Properties of continuous silicon carbide fibers having a fineness of about 10 μm obtained by baking at 1,300° C. are shown in the following Table 1 as one embodiment. Such long fibers can be formed into a bundle form, a network form, a rope form and other various forms. Therefore, a matrix for composite material can be advantageously reinforced in a certain direction by using the fibers.

Table 1

| Properties of continuous silicon carbide fibers | |
| --- | --- |
| Density | 2.5–3.1 g/cm$^3$ |
| Hardness | 9 (Mohs) |
| Tensile strength | 300–500 Kg/mm$^2$ |
| Flexural strength | 300–500 Kg/mm$^2$ |
| Young's modulus | (2.0–4.0) × 10$^4$ Kg/mm$^2$ |
| Oxidation resistance | Even if the fibers are kept at 1,300° C. for 100 hours in air, the weight variation is not observed. |
| Thermal shock resistance | Even if rapid heating and quenching cycle of 25° C. ⇌ 1,000° C. is repeated more than 1,000 times, the texture does not vary. |

Further, the above described silicon carbide fibers obtained by baking spun fibers consisting mainly of organosilicon high molecular weight compound contains usually more than 0.01% by weight of free carbon. This free carbon contained in the fibers diffuses on the contacting surface of the matrix and the fibers, and reacts with the matrix to form locally carbide on the surface of the matrix and to adhere the matrix and fibers more tightly. Therefore, it is very effective to use the above described fibers in the present invention.

The amount of the fibers to be used in the present invention is 10–70% by volume based on the amount the composite, that is, the total amount of ceramics and the fibers, or of ceramics, the fibers and binder. When the amount is less than 10% by volume, the reinforcing effect of the fibers does not substantially appear. While, when the amount is more than 70% by volume, composite materials having properties inherent to ceramics cannot be obtained.

The ceramics to be used as a matrix for composite material in the present invention are commercially available ceramics. However, in order to produce the composite material aimed in the present invention having excellent properties, such as high strength at a high temperature, corrosion resistance, thermal shock resistance and the like, carbides and nitrides are effectively used as a ceramics matrix. However, when composite materials having such excellent properties are not demanded, other ceramics, for example, oxide, silicate, boride, and the like may be used as a matrix in the present invention. The present invention is effective even in the use of these ceramics as a matrix. In order to obtain a high adhesion between the ceramics and the fibers, it is effective in the present invention to use the ceramics in the form of very fine powders having an average grain size of less than 100 μm.

Then, an explanation will be made with respect to the binder, which is added to the powdery matrix for composite materials, if necessary, in the present invention.

As the binder, which is used mainly for sintering powdery matrix into a high-density sintered article, use may be made of binders commonly used in the sintering of the above described respective ceramics. Several embodiments of binders for carbides and nitrides are as follows. The binder for silicon carbide includes boron, aluminum, iron, a mixture of carbon and silicon, silicon nitride and the like. The binder for boron nitride includes boron, borates, boron oxide, silicon nitride, aluminum phosphate, high silicic acid glass and the like. The binder for silicon nitride includes magnesium oxide, aluminum oxide, yttrium oxide and the like. The binder for aluminum nitride includes paraffin, yttrium oxide and the like.

As the binder, which is used mainly for improving the adhesion of the matrix with the fiber, at least one of the above described organosilicon compounds (a)–(d) can be used. The organosilicon compound is mainly converted into SiC by heating. The resulting SiC contains more than 0.01% by weight of free carbon, and this free carbon diffuses on the surface of the ceramics of matrix upon heating, and reacts with the matrix to form locally new carbide. Further, the above described organosilicon compound is formed into SiC upon heating, and the resulting SiC adheres tightly with fibers. Therefore, in addition to the bonding of silicon carbide fibers-SiC (formed by the conversion of organosilicon compound upon heating)-surface layer of matrix, a strong bonding of carbide (formed by the reaction of free carbon contained in the fibers and formed in the heating of the binder of the organosilicon compound)-matrix is formed, whereby the adhesion of the fiber with matrix is more improved. Moreover, the above described organosilicon compound serves to improve the sintering ability of the powdery matrix. Therefore, the addition of the organosilicon compound serves to lower the sintering temperature of the composite and to shorten the sintering time thereof. Accordingly, the organosilicon compound can be used very effectively as a binder in the present invention. However, when powdery silicon carbide and silicon carbide fibers can be tightly adhered with each other by the mutual adhesion of both components and by the action of free carbon as in the case, of, for example, a sintering of a composite consisting of powdery silicon carbide and silicon carbide fibers, the sintering may be carried without the use of the above described organosilicon compound as a binder. On the contrary, when a sintering is carried out under a condition, which makes the adhesion of matrix with fibers poor, for example, when the grain size of powders constituting matrix is not sufficiently small, when the amount of free carbon contained in fibers is relatively small, when the pressure applied to matrix is not sufficiently high, and when the heating temperature is not sufficiently high, the above described organosilicon compound is effectively used as a binder in order to improve the adhesion of matrix with fibers. The organosilicon compound is present in a liquid state, a solid state or an intermediate state thereof, and can be kneaded directly or in a melted state together with the matrix. If necessary, the organosilicon compound may be dissolved in a solvent capable of dissolving the compound, for example, benzene, toluene, xylene, hexane, ether, tetrahydrofuran, dioxane, chloroform, methylene chloride, petroleum ether, petroleum benzine, ligroin, DMSO, DMF and the like, to form a viscous solution, and kneaded together with the matrix in the form of a viscous solution. Among the above described organosilicon compounds, ones, which can be relatively easily produced and whose weight decrease after heating is not small, are advantageously used in the present invention. An embodiment of such organosilicon compounds is polycarbosilane.

The addition amount of the above described binder is 0.5–35% by weight based on the weight of the composite. When the addition amount is less than 0.5% by weight, the effect of the binder is poor. While, when the addition amount exceeds 35% by weight, the binder affects adversely the sintering ability of the matrix and to prevent the formation of a high-density sintered article and rather to lower the strength thereof.

In the present invention, a heat-resistant ceramics composite material (sintered composite) reinforced with continuous silicon carbide fibers is produced by forming the above described powdery matrix for composite material, continuous silicon carbide fibers and a binder, which is used if necessary, into a composite, and pressing and heating the composite. There are various methods for producing the composite. Particularly, the composite can be relatively easily produced by a method, wherein fibers are embedded in a powdery matrix or in a mixture of a powdery matrix and a binder; a method, wherein fibers and a powdery matrix or a mixture of a powdery matrix and a binder are alternately arranged; or a method, wherein a powdery matrix or the above described mixture is filled between fibers previously arranged. These methods can be adopted in the present invention also.

As the method for sintering the composite, there can be used in the present invention a method, wherein after the above described composite is press molded under a pressure of 50–5,000 Kg/cm$^2$ by a rubber press or a mold press, and the molded article is sintered at a temperature of 1,000°–2,500° C.; a method, wherein the composite is hot pressed at a temperature of 1,000°–2,500° C., while applying a pressure of 50–2,000 Kg/cm$^2$; and the like. The above described sintering is carried out under at least one atmosphere of vacuum, and inert gases. However, in some kinds of matrixes, the sintering is able to get along even under the above described atmosphere containing at least one of an oxidizing gas, a hydrocarbon compound gas and hydrogen gas in a partial pressure of less than 10 mmHg.

The sintered composite obtained in the above described method can be made into a sintered composite having a higher density by subjecting the sintered composite to at least one time of a series of the following treatments. That is, the above obtained sintered composite is immersed in a liquid of organosilicon compound under a reduced pressure to be impregnated with the liquid in the grain boundaries and in the pores of the sintered composite, and, if necessary, the degree of impregnation is enhanced under a pressurized atmosphere, and then the impregnated sintered composite is heated, whereby a sintered composite having higher density and strength can be obtained. The impregnated organosilicon compound is converted into SiC by heating, and the resulting SiC is dispersed in the grain boundaries and in the pores of the matrix of the sintered composite. Due to the mutual diffusion of the SiC and the matrix of the sintered composite and to the diffusion of the free carbon, which remains after the heating of the organosilicon compound, into the matrix or the reaction of the free carbon with the matrix, a strong bonding of the SiC with the matrix is formed.

In the above impregnation process, a reduced pressure of less than 10 mmHg is advantageously used in order to improve the density.

The organosilicon compounds to be used in the impregnation treatment are the same as the above described organosilicon compounds used as a binder. However, in order to carry out easily the impregnation, the organosilicon compound can be used in a melted state by heating the compound at a temperature of lower than 450° C. or in the form of a solution having a lower viscosity, which is obtained by dissolving the compounds in a solvent capable of dissolving the compound, for example, benzene, toluene, xylene, hexane, ether, tetrahydrofuran, dioxane, chloroform, methylene chloride, ligroin, petroleum ether, petroleum benzine, DMSO, DMF and the like. However, when the sintered composite can be fully impregnated with the organosilicon compound as such, it is not necessary to use the compound in the form of a solution. The heat treatment is effected at a temperature of 800°–1,400° C. under at least one atmosphere of vacuum and inert gases. However, the heat treatment is able to get along even under the above described atmosphere containing at least one of an oxidizing gas, a hydrocarbon compound gas and hydrogen gas in a partial pressure of less than 10 mmHg. A series of the above described treatments of the impregnation and heat treatment for improving the density can be repeated as far as the impregnation is possible.

Figure 2:
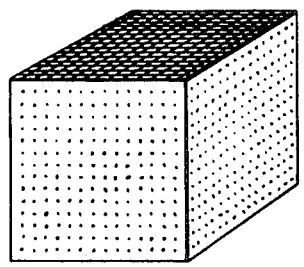

For a better understanding of the invention, reference is taken to the accompanying drawings, wherein:

FIG. 1 is a photograph of bundles of the continuous silicon carbide fibers to be used in the present invention, which are obtained by baking spun fibers consisting mainly of an organosilicon high molecular weight compound; and FIG. 2 is a perspective view of the press-molded article consisting of aluminum nitride and continuous silicon carbide fibers, which is produced in Example 3 described hereinafter.

The following examples are given for the purpose of illustration of this invention and are not intended as limitations thereof.

EXAMPLE 1

An example for producing the continuous silicon carbide fibers to be used in the present invention will be explained hereinafter.

Dimethyldichlorosilane and sodium were reacted to produce dimethylpolysilane. 250 g of dimethylpolysilane was charged in an autoclave having a capacity of 1 l and air in the autoclave was substituted with argon gas and then the reaction was effected at 470° C. for 14 hours. After completion of the reaction, the formed polycarbosilane was discharged as N-hexane solution. This N-hexane solution was filtrated to remove impurities and then N-hexane was evaporated under a reduced pressure, after which the residue was heated in an oil bath at 280° C. under vacuum for 2 hours to effect concentration. Polycarbosilane was obtained in an yield of 40% based on dimethyldichlorosilane. A number average molecular weight of the formed polycarbosilane was 1,700. By using a usual spinning apparatus, the polycarbosilane was heated and melted at 330° C. under argon atmosphere to form a spinning melt and the spinning melt was spun at a spinning rate of 200 m/min to obtain polycarbosilane fibers. The fibers were heated by raising the temperature from 20° C. to 190° C. in air in 6 hours and this temperature was kept for 1 hour to effect an unfusing treatment. The thus treated fibers were heated to 1,300° C. at a temperature raising rate of 100° C./hr under vacuum of $1 \times 10^{-3}$ mmHg and this temperature was kept for 1 hour to form SiC fibers. The formed SiC fibers had an average diameter of 15 $\mu$, an average tensile strength of 350 Kg/mm$^2$, an average Young's modulus of $23 \times 10^3$Kg/mm$^2$ and a specific gravity of 2.70 g/cm$^3$.

To 75% by weight of powdery silicon nitride having a grain size of less than 325 meshes were added 10% by weight of MgO and 5% by weight of powdery polycarbosilane. Then, 10% by weight of bundles of silicon carbide fibers obtained as described above and having a length of 40 mm was embedded in the resulting mixture so that the bundles were arranged as uniformly as possible, to obtain a composite. The composite was press molded by means of a mold press under a pressure of 350 Kg/cm$^2$ to obtain a molded article having a dimension of $10 \times 10 \times 40$ mm$^3$, in which the arranging direction of the fiber bundles was perpendicular to the 10 mm $\times$ 10 mm plane of the molded article. The resulting molded article was heated up to 1,700° C. at a temperature raising rate of 1°–5° C./min. under a mixed gas atmosphere of nitrogen and argon (1:1) and then kept at this temperature for 5 hours to obtain a sintered composite consisting of silicon nitride and silicon carbide fibers. It was ascertained by an electron microscope that the fibers and silicon nitride were tightly adhered in the sintered composite. The following Table 2 shows comparison of the properties of the resulting sintered composite with those of a sintered article consisting of silicon nitride alone, containing no fibers and polycarbosilane and produced in the same manner as described above. In Table 2, the flexural strength is a value measured in a direction perpendicular to the longitudinal direction of the fibers.

Table 2

| Property | Sintered article | Sintered article consisting of silicon nitride alone | Sintered composite consisting of silicon nitride and silicon carbide fibers |
|---|---|---|---|
| Apparent specific gravity | | 2.9 | 2.9 |
| Flexural strength(Kg/mm$^2$) | | 20 | 61 |
| Thermal shock resistance (number of times of repeated rapid heating and quenching cycles of 25° C. ⇌ 1,000° C. until breakage) | | >500 | >1,000 |
| Alkali resistance. Weight decrease in a 50% NaOH aqueous solution for 5 hours (%) | | ~1 | ~0.5 |

As seen from Table 2, the silicon nitride sintered composite reinforced with silicon carbide fibers has a flexural strength as high as about 3 times of that of the sintered article consisting of silicon nitride alone, and further is superior to the sintered article consisting of silicon nitride alone in the thermal shock resistance and alkali resistance. The sintered composite can be used even under severe conditions, such as high stress, high temperature, corrosive atmosphere and the like.

EXAMPLE 2

To 85% by weight of powdery silicon carbide having a grain size of less than 800 meshes was added 5% by weight of silicon nitride as a binder. Then, 10% by weight of bundles of silicon carbide fibers obtained in Example 1 and having a length of 40 mm was embedded in the resulting mixture so that the bundles were arranged as uniformly as possible, to obtain a composite. The composite was press molded at room temperature under a pressure of 100 Kg/cm$^2$ in a hot press die to obtain a molded article having a dimension of $10 \times 10 \times 40$ mm$^3$, in which the arranging direction of the fibers was perpendicular to the 10 mm $\times$ 10 mm plane of the molded article. The resulting molded article was hot pressed by keeping the article at 1,700° C. for 30 minutes under a pressure of 200 Kg/cm$^2$ in argon gas atmosphere to obtain a sintered composite consisting of silicon carbide matrix and silicon carbide fibers. The following Table 3 shows comparison of the properties of the resulting sintered composite with those of a sintered article consisting of silicon carbide alone, containing no fibers and produced in the same manner as described above. In Table 3, the flexural strength is a value measured in a direction perpendicular to the longitudinal direction of the fibers.

Table 3

| Property | Sintered article | Sintered article consisting of silicon carbide alone | Sintered composite consisting of silicon carbide and silicon carbide fibers |
|---|---|---|---|
| Apparent specific gravity | | 3.18 | 3.12 |
| Flexural strength (Kg/mm$^2$) | | 15–18 | 42–59 |
| Oxidation resistance. Weight increase in air at 1,300° C. for 50 hours (%) | | 3–6 | 0.5–2 |
| Wear resistance. Wearing rate by the rubbing with steel (mm$^3$/Kg/Km) | | 0.01–0.05 | 0.004–0.01 |

This Example shows an embodiment of sintered composites produced without the use of organosilicon compound as a binder. As seen from Table 3, a sintered composite having excellent properties can be obtained without the use of a binder. The reason is probably as follows. About 1% by weight of free carbon remaining in the fibers is diffused in the matrix by the heating, and the matrix and the fibers are adhered more tightly by the action of the diffused carbon in addition to the bonding force due to the mutual diffusion of the matrix and the fibers.

EXAMPLE 3

To 70% by weight of powdery aluminum nitride having a grain size of less than 800 meshes was added 15% by weight of Y$_2$O$_3$. The resulting mixture and 15% by weight of a network produced from silicon carbide fibers obtained in Example 1 and having a length of 30 mm were alternately arranged to obtain a composite. The composite was press molded under a pressure of 350 Kg/cm$^2$ by means of a mold press to obtain a molded article having a dimension of $30 \times 30 \times 30$ mm$^3$.

The meshes of the network were arranged at equal intervals as shown in FIG. 2. The resulting molded article was heated up to 1,700° C. at a temperature raising rate of 1°-5° C./min. and kept at this temperature for 3 hours under an argon atmosphere to obtain a sintered composite consisting of aluminum nitride and silicon carbide fibers. The following Table 4 shows comparison of properties of the resulting sintered composite with those of a sintered article consisting of aluminum nitride alone, containing no fibers and produced in the same manner as described above. The flexural strength in Table 4 is a value measured with respect to a test piece cut out from the sintered article in a dimension of $10 \times 10 \times 30$ mm$^3$.

Table 4

| Property | Sintered article consisting of aluminum nitride alone | Sintered composite consisting of aluminum nitride and silicon carbide fibers |
|---|---|---|
| Apparent specific gravity | 2.7 | 2.7 |
| Flexural strength(kg/mm$^2$) | 19–22 | to the meshes of network, ⊥ direction: 48–55  ∥ direction: 35–41 |
| Oxidation resistance. Weight increase in air at 1,200° C. for 5 hours (%) | 4–5 | 3–6 |
| Alkali resistance. Weight decrease in an NaOH aqueous solution for 5 hours (%) | 5–10 | 2–6 |

The sintered composite obtained in this Example 3 contains fibers arranged in the form of a network, and therefore the sintered composite has properties more excellent than those of the sintered article consisting of aluminum nitride alone in spite of the fact that organosilicon compound is not used as a binder in the sintered composite.

EXAMPLE 4

To 75% by weight of powdery boron nitride having a grain size of less than 325 meshes were added 5% by weight of boron oxide and 10% by weight of polycarbosilane previously dissolved in toluene (weight ratio of polycarbosilane to toluene=1:1) and the resulting mixture was kneaded to prepare a homogeneous mixture. Then, 10% by weight of bundles of continuous silicon carbide fibers obtained in Example 1 and having a length of 40 mm was embedded in the mixture so that the bundles were arranged as uniformly as possible, to obtain a composite. The composite was placed in a hot press and press molded at room temperature under a pressure of 100 Kg/cm$^2$ to obtain a molded article having a dimension of $10 \times 10 \times 40$ mm$^3$, in which the arranging direction of the fibers was perpendicular to the 10 mm × 10 mm plane of the molded article. The resulting molded article was hot pressed at 1,800° C. under a pressure of 250 Kg/cm$^2$ for 30 minutes in an argon atmosphere to obtain a sintered composite consisting of boron nitride and silicon carbide fibers. The following Table 5 shows comparison of properties of the resulting sintered composite with those of a sintered article consisting of boron nitride alone, containing no fibers and polycarbosilane and produced in the same manner as described above. In Table 5, the flexural strength is a value measured in a direction perpendicular to the longitudinal direction of the fibers.

Table 5

| Property | Sintered article consisting of boron nitride alone | Sintered composite consisting of boron nitride and silicon carbide fibers |
|---|---|---|
| Apparent specific gravity | 2.2 | 2.3 |
| Flexural strength(Kg/mm$^2$) | 8–10 | 27–34 |
| Oxidation resistance. Weight increase in air at 1,000° C. for 30 hours (mg/cm$^2$) | 4.0–5.1 | 2.7–3.9 |
| Alkali resistance. Weight decrease in an NaOH aqueous solution for 50 hours (mg/cm$^2$) | 13–26 | 7–15 |

As seen from Table 5, the sintered composite consisting of boron nitride and silicon carbide fibers according to the present invention has very excellent properties, and can be used widely.

EXAMPLE 5

A sintered composite consisting of silicon nitride and silicon carbide fibers was produced in the same manner as described in Example 1, except that the sintering temperature was varied to 1,400° C. The resulting sintered composite had an apparent specific gravity of 2.61. The sintered composite was charged into an autoclave together with solid polycarbosilane, the amount of polycarbosilane being sufficient to impregnate the sintered composite. The pressure in the autoclave was reduced to about $1 \times 10^{-3}$ mmHg, and then the autoclave was heated at about 350° C., whereby the sintered composite was sufficiently impregnated with the polycarbosilane of melted state. The impregnated sintered composite was heated at 1,300° C. for 2 hours under an argon atmosphere to obtain a sintered composite having an apparent specific gravity of 2.70. The thus treated sintered composite was further subjected to a series of the above described treatments of impregnation and heating to obtain a sintered composite having an apparent specific gravity of 2.80. That is, a series of the above described treatments can provide a sintered article having a sufficiently high density even at a relatively low heating temperature of 1,400° C. It was found from the observation of the above treated sintered composite by an electron microscope that SiC is formed in the grain boundaries and in the pores of the matrix and adhered tightly with the matrix.

The properties of the above treated sintered composite were substantially the same as those of the sintered composite shown in Table 3.

EXAMPLE 6

Fiber bundles, each consisting of about 100 silicon carbide fibers obtained in Example 1 and having a length of 40 mm, were arranged in a vibration type vessel so that the bundles were arranged in one direction, and then powdery silicon carbide having a grain size of less than 40 μm was filled in the space between the fiber bundles. The vessel was vibrated while the inner pressure of the vessel was keeping under a vacuum of $10^{-2}$ mmHg, to enhance the degree of filling and to obtain a relatively dense composite. The amount of the fibers contained in the composite was 50% by weight. The composite was placed in a hot press die made of graphite so that a pressure would be applied in a direction perpendicular to the longitudinal direction of the fiber bundles. Then, the composite was hot pressed at a maximum temperature of 1,500° C. for 1 hour under a pressure of 200 Kg/cm², while keeping the hot press die under a vacuum atmosphere. Properties of the resulting Sic sintered composite were substantially the same as or a little inferior to those of a sintered composite obtained in Example 2 and shown in Table 3. In this Example 6, a composite material is produced without the use of a binder. However, in this method, powdery silicon carbide and silicon carbide fibers were charged in a vessel under vibration to improve the density of the resulting composite and to increase the amount of the fibers contained in the composite, whereby the adhesion of the powders with the fibers at the sintering was improved and a composite material having excellent properties was obtained.

The above described examples show only several embodiments with respect to carbides and nitrides, which are typical by used as ceramics, among various ceramics capable of being used as a matrix for composite material in the present invention. However, it can be easily conceived that, when ceramics other than the carbides and the nitrides are used as a matrix, composite materials having excellent properties substantially the same as those of composite materials using the carbides or the nitrides can be also obtained by method of the present invention.

As mentioned above, excellent composite materials reinforced with fibers can be obtained in a relatively low cost according to the present invention, and it can be expected that the composite materials can be used in all of the fields, where composite materials are used at present, and further in many fields, where higher heat resistance, oxidation resistance, corrosion resistance and mechanical strength at a high temperature are required, for example, in crucibles for melting, furnace materials for melting, various pipes, various nozzles, turbine blades, various vessels, dies for hot press, jet engine parts, abrasive materials, coating materials, materials for electron furnace and the like.

What is claimed is:

1. A method for producing heat-resistant composite materials reinforced with continuous silicon carbide fibers, which comprises forming a powdery ceramics matrix having an average grain size of smaller than 100 μm and continuous silicon carbide fibers and obtained by baking spun fibers of an organosilicon high molecular weight compound into a composite, and pressing and heating said composite into a sintered composite.

2. A method according to claim 1, wherein the composite contains a binder in addition to the continuous silicon carbide fibers and the powdery ceramics matrix.

3. A method according to claim 1, wherein the resulting sintered composite is further subjected to at least one time of a series of treatments, in which the sintered composite is impregnated with an organosilicon high molecular weight compound in a liquid state under a reduced pressure and then the impregnated sintered composite is heated under at least one atmosphere of vacuum and inert gases, to produce a sintered composite having a higher density.

4. A method according to claim 1, wherein the powdery ceramics matrix is at least one of carbide ceramics and nitride ceramics.

5. A method according to claim 1, wherein the use amount of the silicon carbide fibers is 10-70% by volume based on the amount of the composite.

6. A method according to claim 1, wherein the silicon carbide fibers are embedded in the powdery ceramics matrix to form the composite.

7. A method according to claim 1, wherein the silicon carbide fibers and the powdery ceramics matrix are alternately arranged to form the composite.

8. A method according to claim 1, wherein the powdery ceramics matrix is filled in the space between the silicon carbide fibers previously arranged.

9. A method according to claim 1, wherein the sintering is effect at a temperature of 1,000°-2,500° C.

10. A method according to claim 1, wherein the sintering is effected under at least one atmosphere of vacuum and an inert gas.

11. A method according to claim 2, wherein the binder is at least one selected from the group consisting of boron, aluminum, iron, a mixture of carbon and silicon, silicon nitride, borates, boron oxide, aluminum phosphate, high silicic acid glass, magnesium oxide, aluminum oxide, yttrium oxide, paraffin and organosilicon high molecular weight compounds.

* * * * *